United States Patent
Zhang et al.

(10) Patent No.: US 11,336,702 B2
(45) Date of Patent: May 17, 2022

(54) INTERACTION INFORMATION TRANSMISSION METHOD AND APPARATUS

(71) Applicant: HUAWEI TECHNOLOGIES CO., LTD., Guangdong (CN)

(72) Inventors: Yaoye Zhang, Nanjing (CN); Teng Shi, Nanjing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 17/144,925

(22) Filed: Jan. 8, 2021

(65) Prior Publication Data
US 2021/0136128 A1 May 6, 2021

Related U.S. Application Data

(63) Continuation of application No. PCT/CN2019/103473, filed on Aug. 30, 2019.

(30) Foreign Application Priority Data

Sep. 7, 2018 (CN) .......................... 201811045845.7

(51) Int. Cl.
*H04L 29/06* (2006.01)
*H04M 19/04* (2006.01)
(Continued)

(52) U.S. Cl.
CPC .......... *H04L 65/40* (2013.01); *H04L 65/1006* (2013.01); *H04M 3/42017* (2013.01); *H04M 19/04* (2013.01); *H04N 7/147* (2013.01)

(58) Field of Classification Search
CPC ....... H04L 65/00–1006; H04L 65/1066; H04L 65/1083; H04L 65/1096; H04L 65/40;
(Continued)

(56) References Cited

U.S. PATENT DOCUMENTS 6,845,389 B1 * 1/2005 Sen .................... A63F 13/12
709/204
7,603,433 B1 * 10/2009 Paterik ................ H04M 3/493
370/352
(Continued)

FOREIGN PATENT DOCUMENTS

CN        101031097 A    9/2007
CN        101119337 A    2/2008
(Continued)

OTHER PUBLICATIONS

Handley et al., RFC2327—"SDP: Session Description Protocol", Network Working Group (Year: 1998).*
(Continued)

*Primary Examiner* — Boris D Grijalva Lobos
(74) *Attorney, Agent, or Firm* — Womble Bond Dickinson (US) LLP

(57) ABSTRACT

This application provides an interaction information transmission method and apparatus. The method includes: receiving, by a calling terminal from an RBT-AS, an SDP message including interaction information related to a video ring back tone; receiving, by the calling terminal from the RBT-MRS, a video ring back tone media stream including the video ring back tone; and playing, by the calling terminal, the video ring back tone in a display interface, and displaying interaction content related to the interaction information. Since the RBT-AS configures the interaction information into the SDP message and sends the SDP message to the calling terminal, the calling terminal does not need to perform decoding and can directly obtain the interaction information and the RBT-AS does not need to encode the interaction information either. Therefore, encoding and decoding processes are not required at a transmit end and a
(Continued)

receive end respectively, avoiding extra processing overheads.

16 Claims, 11 Drawing Sheets

(51) Int. Cl.
*H04M 3/42* (2006.01)
*H04N 7/14* (2006.01)
*H04L 65/40* (2022.01)
*H04L 65/10* (2022.01)

(58) Field of Classification Search
CPC .... H04M 3/42017; H04M 19/04; H04N 7/00; H04N 7/14; H04N 7/141; H04N 7/147
See application file for complete search history.

(56) References Cited

U.S. PATENT DOCUMENTS

| | | | |
|---|---|---|---|
| 8,553,869 B2* | 10/2013 | Zhu | H04L 65/1016 379/257 |
| 9,635,069 B2* | 4/2017 | Dornich | H04M 3/00 |
| 2006/0227785 A1* | 10/2006 | Cournut | H04N 7/148 370/392 |
| 2007/0211872 A1 | 9/2007 | Cai et al. | |
| 2007/0294425 A1* | 12/2007 | Sobti | H04M 3/02 709/231 |
| 2009/0265220 A1 | 10/2009 | Bayraktar et al. | |
| 2010/0121963 A1* | 5/2010 | Peng | H04N 21/643 709/228 |
| 2011/0150203 A1* | 6/2011 | Stille | H04M 7/129 379/207.16 |
| 2015/0026354 A1 | 1/2015 | Zhao | |

FOREIGN PATENT DOCUMENTS

| | | |
|---|---|---|
| CN | 101730321 A | 6/2010 |
| CN | 101160941 B | 4/2012 |
| CN | 106027817 A | 10/2016 |
| CN | 106303104 A | 1/2017 |
| KR | 20140047560 A | 4/2014 |
| WO | 2011130973 A1 | 10/2011 |

OTHER PUBLICATIONS

3GPP TS 24.182 V15.0.0:"3rd Generation Partnership Project;Technical Specification Group Core Network and Terminals;IP Multimedia Subsystem (IMS) Customized Alerting Tones (CAT);Protocol specification(Release 15)",Mar. 2018,total 156 pages.

* cited by examiner

INTERACTION INFORMATION TRANSMISSION METHOD AND APPARATUS

CROSS-REFERENCE TO RELATED APPLICATIONS

This application is a continuation of International Application No. PCT/CN2019/103473, filed on Aug. 30, 2019, which claims priority to Chinese Patent Application No. 201811045845.7, filed on Sep. 7, 2018. The disclosures of the aforementioned applications are hereby incorporated by reference in their entireties.

TECHNICAL FIELD

This application relates to the field of communications technologies, and in particular, to an interaction information transmission method and apparatus.

BACKGROUND

An audio ring back tone service is a conventional value-added service (VAS). After a user subscribes to the service on a telecom carrier website and selects a ring back tone, the ring back tone selected by the user can be heard at a ringing phase on all terminals that call the user. A video ring back tone is a full upgrade to the conventional audio ring back tone service, and the original prosaic audio ring back tone takes a form of rich media that integrates audio and video in a voice over long term evolution (VoLTE) era.

In a related technology, if a calling terminal that serves as a client needs to play a video ring back tone at a ringing phase, a ring back tone media resource server (RBT-MRS) needs to transmit a video ring back tone media stream to the calling terminal. If interaction services, such as giving likes, shares and comments, need to be further provided for the user in a process of playing the video ring back tone, the calling terminal needs to obtain interaction content from an interaction server based on an interaction identifier in interaction information. The interaction content refers to controls, images, numbers, and texts displayed for the user when the calling terminal provides the interaction services, such as a quantity of likes and an icon for giving a like. The interaction information can be sent to the calling terminal only after additional an audio and video coder encodes the interaction information into the video ring back tone media stream. After receiving the video ring back tone media stream, the calling terminal further needs an additional coder to decode the video ring back tone media stream, to obtain the interaction information and obtain the interaction content.

In the related technology, the interaction information needs to be transmitted through a media stream. In a transmission process, a transmit end needs to encode the interaction information and transmit encoded interaction information through the media stream. After receiving the media stream, a receive end needs to decode the received media stream to obtain the interaction information. Therefore, coders need to be deployed at the transmit end and the receive end for encoding and decoding respectively. Consequently, extra processing overheads are required.

SUMMARY

Embodiments of this application provide an interaction information transmission method and apparatus, which may be used to avoid extra processing overheads caused by deployment of coders at a transmit end and a receive end for encoding and decoding purposes respectively in a process of transmitting interaction information.

According to a first aspect, this application provides an interaction information transmission method, and the method includes:

receiving, by a calling terminal, a session description protocol (SDP) message sent by a ring back tone application server (RBT-AS), where the SDP message includes interaction information related to a video ring back tone; receiving, by the calling terminal, a video ring back tone media stream sent by a ring back tone media resource server (RBT-MRS), where the video ring back tone media stream includes the video ring back tone; and playing, by the calling terminal, the video ring back tone in a display interface, and displaying interaction content related to the interaction information.

According to the method provided in this aspect, the RBT-AS configures the interaction information into the SDP message and sends the SDP message to the calling terminal. In this way, after receiving the SDP message, the calling terminal does not need to perform decoding and can directly obtain the interaction information from the SDP message. In addition, the RBT-AS that serves as a transmit end does not need to encode the interaction information either when sending the interaction information. Therefore, encoding and decoding processes are not required at the transmit end and a receive end respectively, and extra processing overheads are avoided.

With reference to the first aspect, in one embodiment of the first aspect, the interaction information includes at least one interaction identifier used for indicating the interaction content and a uniform resource locator (URL) corresponding to each of the at least one interaction identifier, where the URL includes an address of an interaction resource server (IRS) and a storage address of the interaction content in the IRS. Before the displaying, by the calling terminal, interaction content related to the interaction information, the method further includes: sending, by the calling terminal, a resource request message to the IRS, where the resource request message includes the at least one interaction identifier and the URL corresponding to each of the at least one interaction identifier; and receiving, by the calling terminal, the interaction content sent by the IRS, where the interaction content is determined by the IRS based on the at least one interaction identifier and the URL corresponding to each of the at least one interaction identifier that are in the resource request message.

In one embodiment, the calling terminal requests the interaction content from the IRS based on the interaction identifier and the URL corresponding to the interaction identifier that are in the interaction information, so that the calling terminal can display the interaction content related to the interaction information when playing the video ring back tone.

With reference to the first aspect, in another embodiment of the first aspect, the method further includes: obtaining, by the calling terminal, an interaction operation event that is of a calling user and that is recorded by an operating system of the calling terminal; determining, by the calling terminal, an interaction operation procedure corresponding to the interaction operation event, based on the interaction operation event, a relationship between the interaction operation event and interaction content corresponding to the interaction operation event, and a relationship between the interaction content and the interaction operation procedure corresponding to the interaction content; performing, by the calling terminal, the interaction operation procedure and obtaining an interaction operation result; and sending, by the calling terminal, the interaction operation result to the IRS, so that the IRS updates the interaction operation result to an interaction content database.

In one embodiment, the interaction operation procedure corresponding to the interaction operation event of a caller is determined and performed, interaction with a user is performed, and the interaction operation result is obtained. In this case, the calling terminal can perform different procedures based on different interaction operations of the user, to accurately obtain the interaction operation result.

With reference to the first aspect, in still another embodiment of the first aspect, the interaction operation procedure includes: generating and displaying a new interface element, and collecting data subsequently input by the user. In addition, another interaction operation procedure may be further included, and this is not limited in this application.

According to a second aspect, this application provides an interaction information transmission method, and the method includes: obtaining, by a ring back tone application server (RBT-AS), interaction information related to a video ring back tone; configuring, by the RBT-AS, the interaction information into a session description protocol (SDP) to generate an SDP message; and sending, by the RBT-AS, the SDP message to a calling terminal, so that after receiving a video ring back tone media stream, the calling terminal plays the video ring back tone in a display interface and displays interaction content related to the interaction information of the video ring back tone.

According to the method provided in this aspect, the RBT-AS configures the interaction information into the SDP message and sends the SDP message to the calling terminal. Because the interaction information is included in the SDP message, the calling terminal does not need to perform decoding and can directly obtain the interaction information from the SDP message. In addition, the RBT-AS that serves as a transmit end does not need to encode the interaction information either when sending the interaction information. Therefore, encoding and decoding processes are not required at the transmit end and a receive end respectively, and extra processing overheads are avoided.

With reference to the second aspect, in one embodiment of the second aspect, the obtaining, by an RBT-AS, interaction information related to a video ring back tone includes: sending, by the RBT-AS, a first request message to an interaction resource server (IRS), where the first request message includes a called user identifier and a ring back tone identifier; and receiving, by the RBT-AS, the interaction information fed back by the IRS based on the called user identifier and the ring back tone identifier.

In one embodiment, the RBT-AS requests the interaction information from the IRS through the first request message. Because the first request message includes the called user identifier and the ring back tone identifier, the IRS can accurately determine the interaction information related to the video ring back tone based on the first request message of the RBT-AS.

With reference to the second aspect, in another embodiment of the second aspect, the interaction information includes at least one interaction identifier used for indicating the interaction content and a uniform resource locator (URL) corresponding to each of the at least one interaction identifier, where the URL includes an address of the IRS and a storage address of the interaction content in the IRS. The configuring, by the RBT-AS, the interaction information into an SDP to generate an SDP message includes: adding, by the RBT-AS, each of the at least one interaction identifier and the URL corresponding to the interaction identifier that are in the interaction information to a format field of information i to form the SDP message.

In one embodiment, the RBT-AS adds the interaction information to the format field of the information i to form the SDP message that includes the interaction information, to avoid encoding the interaction information and avoid extra processing overheads.

According to a third aspect, this application provides an interaction information transmission method, where the method includes: receiving, by an interaction resource server (IRS), a first request message sent by a ring back tone application server (RBT-AS), where the first request message includes a called user identifier and a ring back tone identifier; determining, by the IRS based on the called user identifier and the ring back tone identifier, interaction information corresponding to the called user identifier and the ring back tone identifier; and sending, by the IRS, the interaction information to the RBT-AS, so that the RBT-AS generates a session description protocol (SDP) message based on the interaction information.

According to the method provided in this aspect, the IRS sends the interaction information to the RBT-AS based on the first request message, and the RBT-AS generates the SDP message based on the interaction information. In this way, after receiving the SDP message, a calling terminal does not need to perform decoding and can directly obtain the interaction information from the SDP message. In addition, the RBT-AS that serves as a transmit end does not need to encode the interaction information either when sending the interaction information. Therefore, encoding and decoding processes are not required at the transmit end and a receive end respectively, and extra processing overheads are avoided.

With reference to the third aspect, in one embodiment of the third aspect, the interaction information includes at least one interaction identifier used for indicating interaction content and a uniform resource locator (URL) corresponding to each of the at least one interaction identifier, where the URL includes an address of the IRS and a storage address of the interaction content in the IRS. After the sending, by the IRS, the interaction information to the RBT-AS, the method further includes: receiving, by the IRS, a resource request message sent by a calling terminal, where the resource request message includes the at least one interaction identifier and the URL corresponding to each of the at least one interaction identifier; determining, by the IRS, related interaction content based on the at least one interaction identifier and the URL corresponding to each of the at least one interaction identifier; and sending, by the IRS, the interaction content to the calling terminal.

In one embodiment, the IRS sends the interaction content to the calling terminal based on the interaction identifier and the URL corresponding to the interaction identifier that are in the resource request message. In this way, the calling terminal can display the interaction content related to the interaction information when playing a video ring back tone.

It should be noted that the IRS in this aspect and the RBT-MRS in the second aspect may be deployed together as a same server or server cluster, or may be separately deployed as different servers or server clusters. The RBT-AS and the RBT-MRS may be deployed together as a same server or server cluster, or may be separately deployed as different servers or server clusters. This is not limited in this application.

According to a fourth aspect, this application provides an interaction information transmission apparatus, where the apparatus includes modules configured to perform the method operations in the first aspect and the embodiments of the first aspect. In one embodiment, the apparatus includes a receiving module and a processing module, and may further include another module or unit such as a sending module or a storage module.

According to a fifth aspect, this application further provides an interaction information transmission apparatus, where the apparatus includes modules configured to perform the method operations in the second aspect and the embodiments of the second aspect, and/or modules configured to perform the method operations in the third aspect and the embodiments of the third aspect. In one embodiment, the apparatus includes a receiving module, a processing module, and a sending module, and may further include another module or unit such as a storage module.

According to a sixth aspect, this application further provides a terminal, where the terminal includes the apparatus described in the fourth aspect.

In one embodiment, the terminal includes a calling terminal and a called terminal. The calling terminal is configured to perform the interaction information transmission method in the first aspect and the embodiments of the first aspect.

According to a seventh aspect, this application further provides a server, where the server includes the apparatus described in the fifth aspect.

In one embodiment, the server may be an interaction resource server IRS or a ring back tone application server RBT-AS, or may be a server or server cluster that includes an IRS and an RBT-AS.

In one embodiment, the server may be an RBT-AS or an RBT-MRS, or may be a server or server cluster that includes an RBT-AS and an RBT-MRS.

According to an eighth aspect, this application further provides a computer storage medium. The computer storage medium may store a program, and when the program is executed, some or all of the operations in the foregoing aspects, including the interaction information transmission method provided in the embodiments of this application, may be performed.

According to a ninth aspect, this application further provides a computer program product. The computer program product includes one or more computer instructions, for example, device upgrade instructions. When the computer instructions are loaded and executed on a computer, some or all of the operations in the interaction information transmission method provided in the embodiments of this application may be performed.

This application provides an interaction information transmission method and apparatus. The RBT-AS configures the interaction information into the SDP message and sends the SDP message to the calling terminal. In this way, after receiving the SDP message, the calling terminal does not need to perform decoding and can directly obtain the interaction information from the SDP message. In addition, the RBT-AS that serves as a transmit end does not need to encode the interaction information either when sending the interaction information. Therefore, encoding and decoding processes are not required at the transmit end and a receive end respectively, and extra processing overheads are avoided.

DESCRIPTION OF EMBODIMENTS

To enable a person skilled in the art to better understand the technical solutions in the embodiments of this application, and make the objectives, features, and advantages of the embodiments of this application clearer, the following further describes the technical solutions in the embodiments of this application in detail with reference to the accompanying drawings.

Before the technical solutions in the embodiments of this application are described, a network architecture of the embodiments of this application is first described with reference to the accompanying drawings.

Figure 1A:
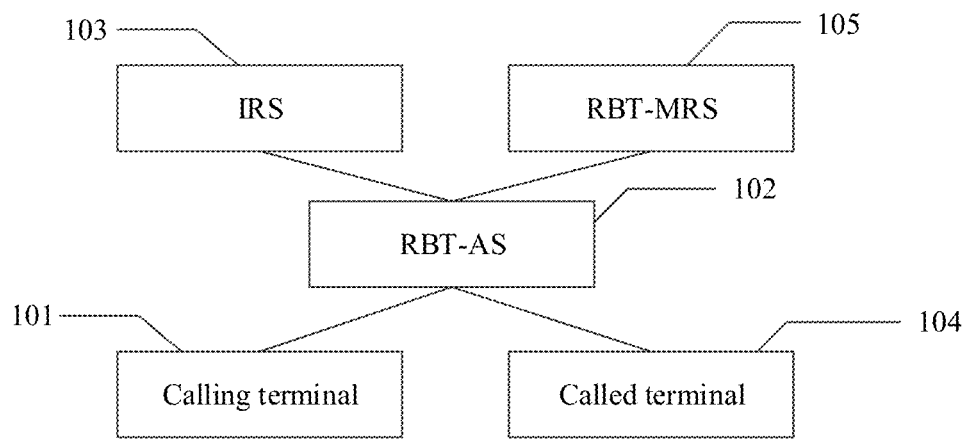
FIG. 1A is a schematic diagram of a network architecture according to this application.

FIG. 1A is a schematic diagram of a network architecture applicable to an embodiment of this application. The network architecture may include a calling terminal 101, a ring back tone application server (RBT-AS) 102, an interaction resource server (IRS) 103, a called terminal 104, and a ring back tone media resource server (RBT-MRS) 105.

The calling terminal 101 and the called terminal 104 are user equipments (UE) having a session function, and can perform a calling operation and a called operation respectively. For example, the calling terminal 101 and the called terminal 104 are devices such as mobile phones, tablets, wearable devices, portable computers, or the like. In one call, the calling terminal 101 performs the calling operation, and the called terminal 104 performs the called operation. The calling terminal 101 and the called terminal 104 each are communicatively connected to the RBT-AS 102.

The RBT-AS 102 is a server configured to process message exchange and media resource negotiation in a ring back tone signaling interaction procedure.

The IRS 103 is a server configured to store and manage interaction information and interaction content. The IRS 103 is communicatively connected to the RBT-AS 102, to transmit the interaction information. The IRS 103 is further communicatively connected to the calling terminal 101, to transmit the interaction content.

The RBT-MRS 105 is a server configured to store and manage media content, for example, store an audio ring back tone media stream and a video ring back tone media stream of a ring back tone.

Figure 1B:
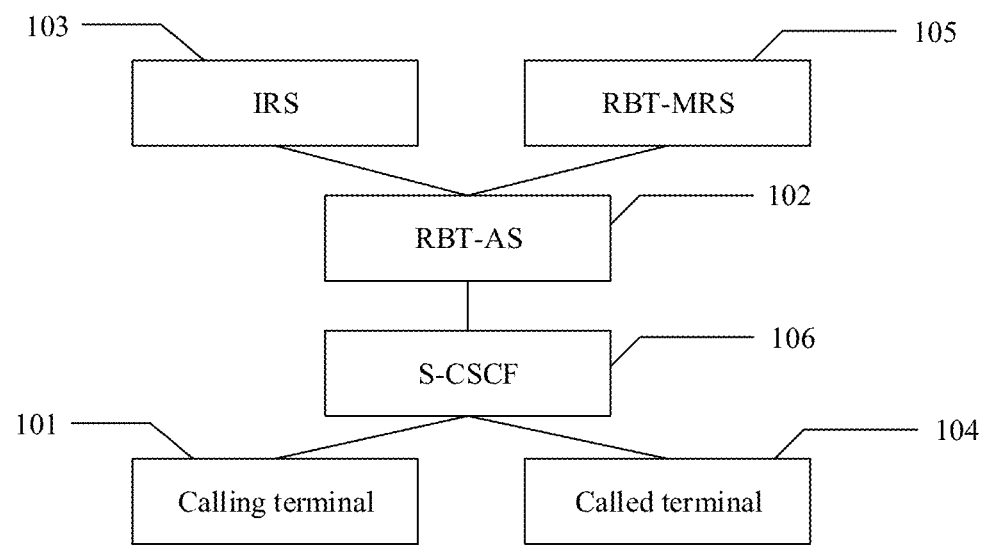
FIG. 1B is a schematic diagram of another network architecture according to this application.

In one embodiment, as shown in FIG. 1B, the network architecture further includes a serving-call session control function (S-CSCF) 106.

The S-CSCF 106 is a network element located in a home IP multimedia subsystem (IMS) network, and is responsible for session control and registration request for the user equipment. When the user equipment is in a session, the S-CSCF 106 manages a session state in the network. The calling terminal 101 and the called terminal 102 are communicatively connected to the RBT-AS 102 via the S-CSCF 106.

It should be noted that descriptions of the network architecture in FIG. 1A and FIG. 1B do not limit a deployment manner of a server. The IRS 103 and the RBT-MRS 105 may be deployed together as a same server or server cluster, or may be separately deployed as different servers or server clusters. The RBT-AS 102 and the RBT-MRS 105 may be deployed together as a same server or server cluster, or may be separately deployed as different servers or server clusters. This is not limited in this embodiment of this application.

Figure 2:
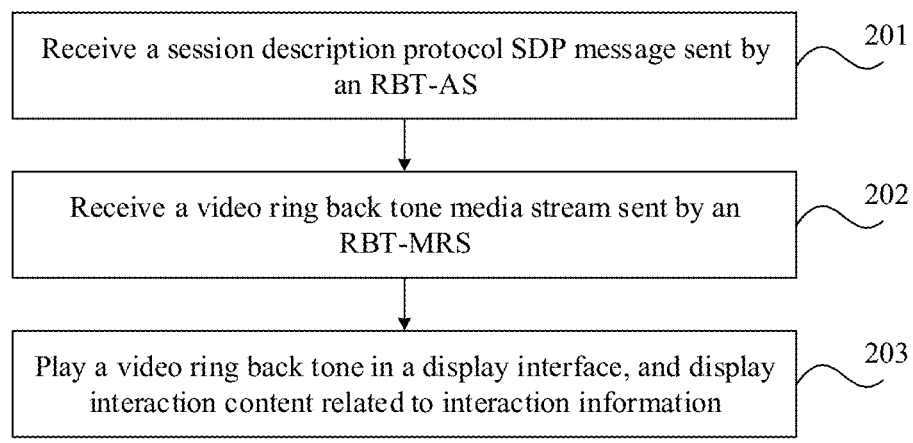
FIG. 2 is a flowchart of an interaction information transmission method according to an embodiment of this application.

FIG. 2 is a flowchart of an interaction information transmission method according to an embodiment of this application. The method may be applied to the calling terminal in the network architecture shown in FIG. 1A.

In one embodiment, the method may include the following operations.

Operation 201: The calling terminal receives a session description protocol (SDP) message sent by an RBT-AS.

After the calling terminal completes call resource negotiation and reservation with a called terminal, and the called terminal starts ringing, the calling terminal receives the SDP message sent by the RBT-AS. The SDP message includes interaction information. The calling terminal may obtain, based on the interaction information, interaction content related to the interaction information. The SDP message is bottom-layer information, and is used to describe a transmission parameter such as a port number and does not need to be encoded for transmission. Therefore, the interaction information transmitted between the calling terminal and the RBT-AS through the SDP message does not need to be encoded or decoded.

Operation 202: The calling terminal receives a video ring back tone media stream sent by an RBT-MRS.

After the called terminal starts ringing, the calling terminal needs to play a video ring back tone. In this case, the calling terminal receives the video ring back tone media stream sent by the RBT-MRS, where the video ring back tone media stream includes a video ring back tone. The calling terminal obtains, from the video ring back tone media stream sent by the RBT-MRS, the video ring back tone that needs to be played.

Further, the video ring back tone media stream is a type of media stream, and the media stream refers to a format of media played over the internet in a streaming transmission manner. The media stream may also be referred to as streaming media, which means that a merchant uses a video transmission server to send, to a network, a program as a data packet. After a user decompresses the data through the decompression device, the program is displayed as it is before being sent.

Operation 203: The calling terminal plays the video ring back tone in a display interface, and displays the interaction content related to the interaction information.

When the called terminal is ringing, the calling terminal plays the video ring back tone in the display interface for a user to watch. The display interface is an interface when the calling terminal waits for the called terminal to answer. Meanwhile, the calling terminal displays the interaction content related to the interaction information in the display interface for the user to interact, for example, displays a like icon for the user to give a like to the video ring back tone.

In this embodiment of this application, the RBT-AS configures the interaction information into the SDP message and sends the SDP message to the calling terminal, so that after obtaining the SDP message, the calling terminal does not need to perform decoding and can directly obtain the interaction information from the SDP message. In addition, when sending the interaction information, the RBT-AS that serves as a transmit end does not need to encode the interaction information either. Therefore, encoding and decoding processes are not required at the transmit end and a receive end respectively, and extra processing overheads are avoided.

The following describes in detail method operations of each network device in the technical solutions of this application.

Figure 3:
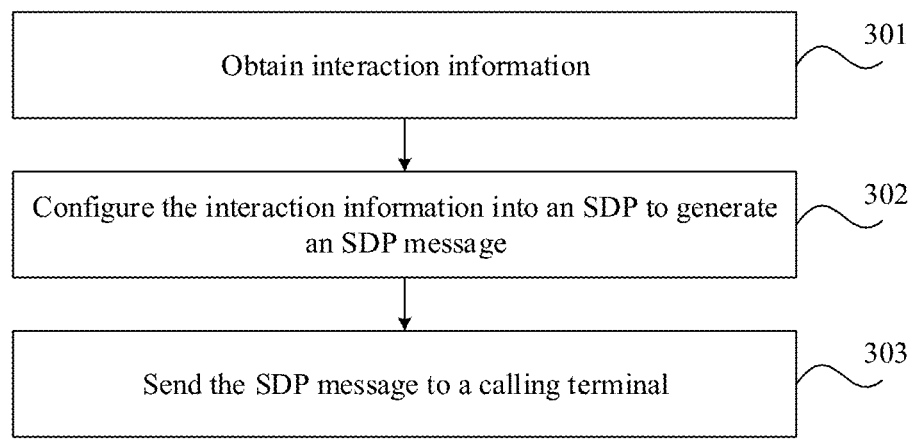
FIG. 3 is a flowchart of another interaction information transmission method according to an embodiment of this application.

FIG. 3 is a flowchart of an interaction information transmission method according to an embodiment of this application. The method may be applied to the RBT-AS in the network architecture shown in FIG. 1A. The method may include the following operations.

Operation 301: The RBT-AS obtains interaction information.

After a calling terminal completes call resource negotiation and reservation with a called terminal, and the called terminal starts ringing, the RBT-AS needs to negotiate with the calling terminal for a video ring back tone resource, to transmit a video ring back tone media stream and to enable the calling terminal to play a video ring back tone. During negotiation between the RBT-AS and the calling terminal, the RBT-AS needs to obtain and send an SDP message to the calling terminal.

Further, before sending the SDP message, the RBT-AS first determines a video ring back tone to be played by the calling terminal when the called terminal rings, and communicates with an IRS to obtain the interaction information related to the video ring back tone. The interaction information obtained by the RBT-AS is interaction information corresponding to the video ring back tone (that is, the video ring back tone to be played by the calling terminal) subscribed to by the called party.

Operation 302: The RBT-AS configures the interaction information into an SDP to generate the SDP message.

After obtaining the SDP and the interaction information, the RBT-AS configures the interaction information into the SDP to generate the SDP message.

Operation 303: The RBT-AS sends the SDP message to the calling terminal.

The RBT-AS sends the SDP message to the calling terminal, so that after receiving the video ring back tone media stream, the calling terminal plays the video ring back tone in a display interface and displays interaction content related to the interaction information of the video ring back tone.

In this embodiment of this application, the RBT-AS configures the interaction information into the SDP message and sends the SDP message to the calling terminal. Because the interaction information is included in the SDP message, the calling terminal does not need to perform decoding and can directly obtain the interaction information from the SDP message. In addition, the RBT-AS does not need to encode the interaction information either when sending the interaction information. Therefore, encoding and decoding processes are not required at a transmit end and a receive end respectively, and extra processing overheads are avoided.

Figure 4:
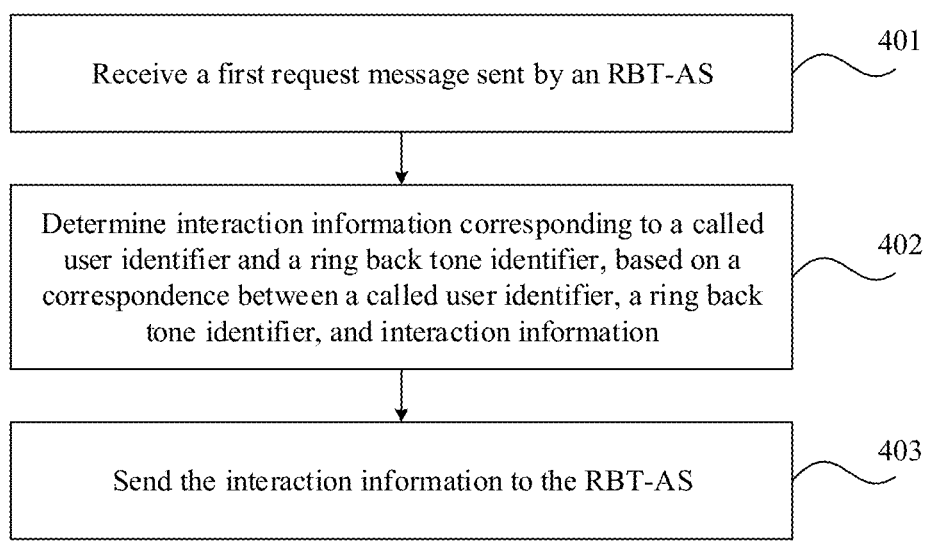
FIG. 4 is a flowchart of another interaction information transmission method according to an embodiment of this application.

FIG. 4 is a flowchart of an interaction information transmission method according to an embodiment of this application. The method may be applied to the IRS in the network architecture shown in FIG. 1A. The method may include the following operations.

Operation 401: The IRS receives a first request message sent by an RBT-AS.

When obtaining interaction information, the RBT-AS sends the first request message to the IRS, where the first request message includes a called user identifier and a ring back tone identifier. Correspondingly, the IRS receives the first request message sent by the RBT-AS. The called user identifier is used to indicate a unique called user, and the ring back tone identifier is used to indicate a unique video ring back tone.

Operation 402: The IRS determines interaction information corresponding to the called user identifier and the ring back tone identifier, based on a correspondence between a called user identifier, a ring back tone identifier, and interaction information.

Because the called user identifier is used to indicate the unique called user and the ring back tone identifier is used to indicate the unique video ring back tone, a pair of the called user identifier and the ring back tone identifier may be used to determine a video ring back tone subscribed to by a called user, and further to determine interaction information corresponding to the video ring back tone subscribed to by the called user. The IRS stores the correspondence between a called user identifier, a ring back tone identifier, and interaction information. The IRS determines, based on the called user identifier, the ring back tone identifier, and the correspondence, the interaction information requested by the RBT-AS.

Operation 403: The IRS sends the interaction information to the RBT-AS.

The IRS sends the interaction information to the RBT-AS, so that the RBT-AS generates a session description protocol SDP message based on the interaction information.

In this embodiment, the IRS sends the interaction information to the RBT-AS based on the first request message, so that the RBT-AS generates the SDP message based on the interaction information. In this way, after obtaining the SDP message, a calling terminal does not need to perform decoding and can directly obtain the interaction information from the SDP message. In addition, when sending the interaction information, the RBT-AS that serves as a transmit end does not need to encode the interaction information either. Therefore, encoding and decoding processes are not required at the transmit end and a receive end respectively, and extra processing overheads are avoided.

Figure 5A:
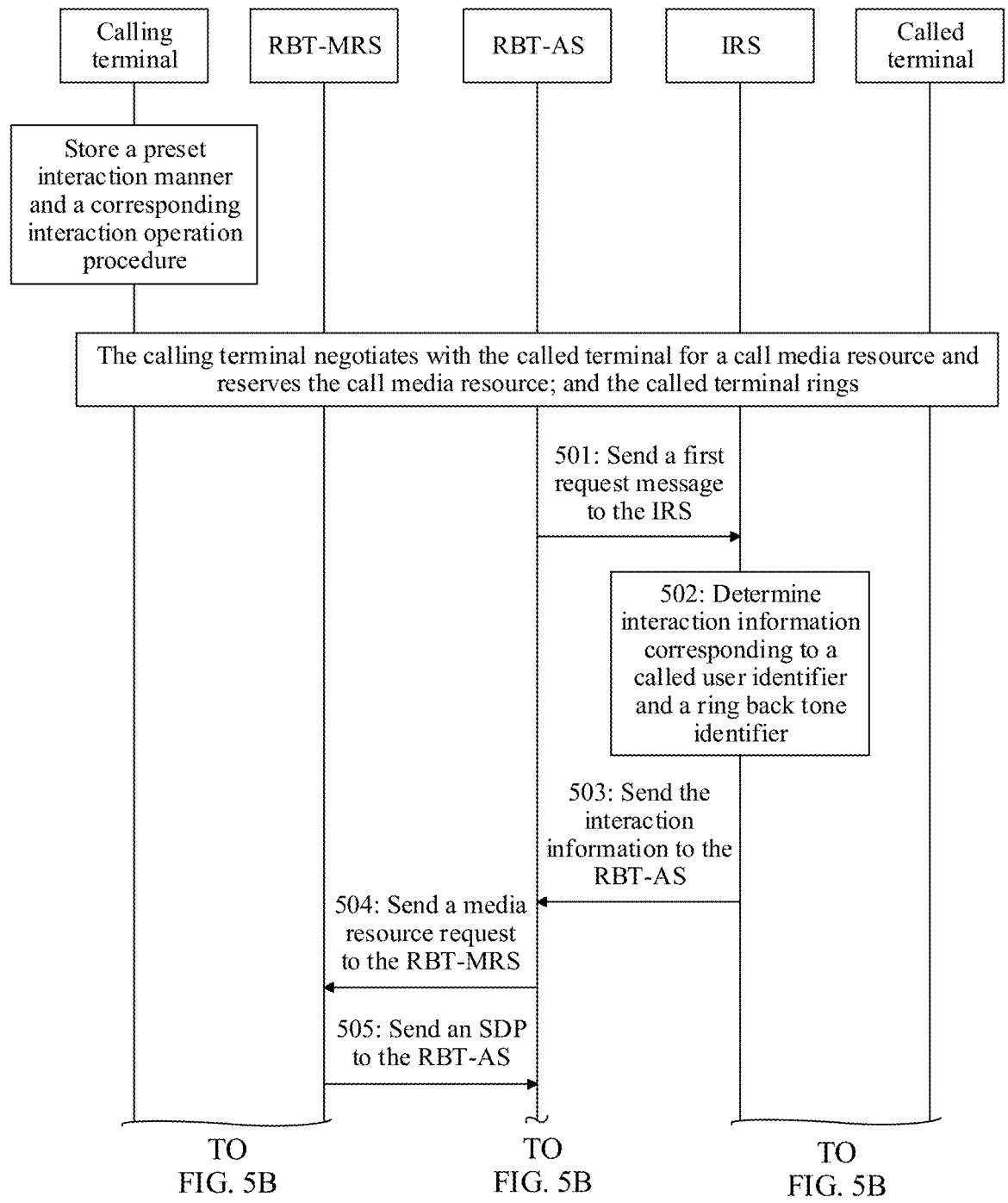
FIG. 5A, FIG. 5B, and FIG. 5C are a flowchart of another interaction information transmission method according to an embodiment of this application.
Figure 5B:
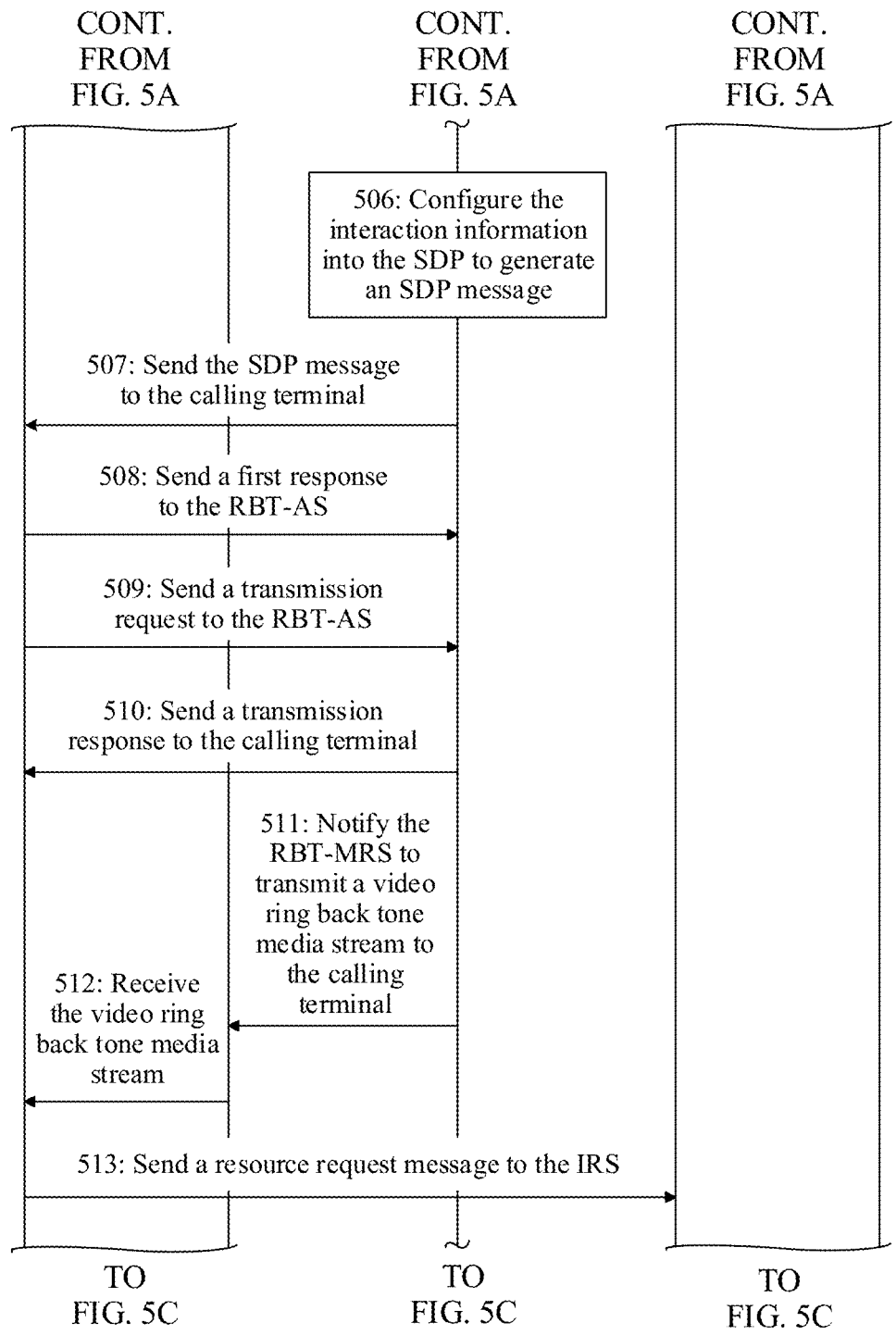
Figure 5C:
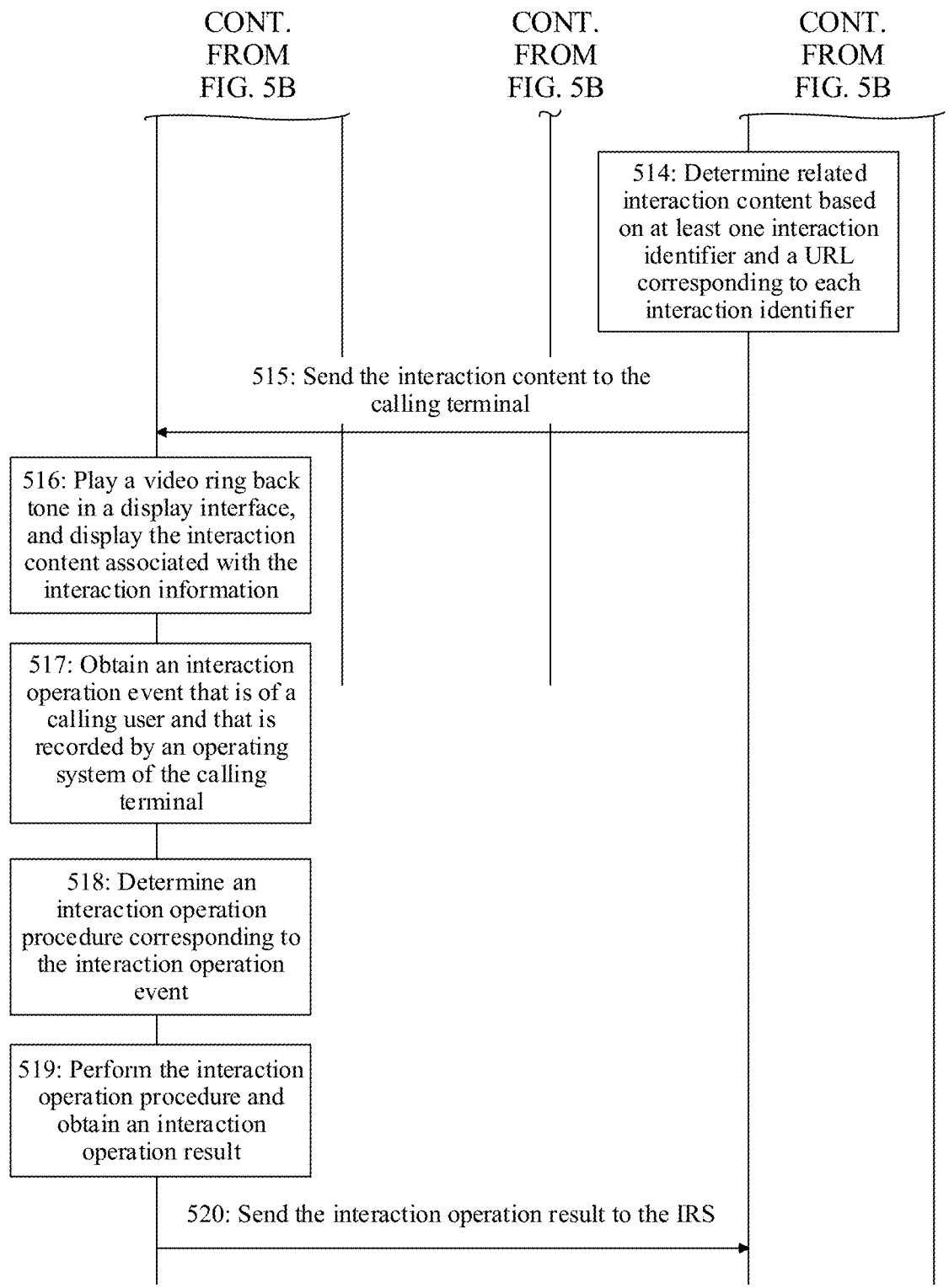

In one embodiment, FIG. 5A, FIG. 5B, and FIG. 5C are a flowchart of an interaction information transmission method according to an embodiment of this application. The method may be applied to the network architecture shown in FIG. 1A or FIG. 1B.

In one embodiment, the method may include the following operations.

Operation 501: An RBT-AS sends a first request message to an IRS.

When a calling terminal performs a calling operation and calls a called terminal, the calling terminal negotiates with the called terminal for a call media resource. After negotiation is completed, the calling terminal reserves the call media resource, and the called terminal rings.

The call media resource refers to a transmission parameter for transmitting audio and/or video during a call between the calling terminal and the called terminal. In one embodiment, the call media resource includes at least one of the following: an Internet protocol (IP), a port number, a transmission protocol, an encoding format, and a bandwidth.

After the negotiation for the call media resource is completed between the calling terminal and the called terminal, a video ring back tone that needs to be played by the calling terminal is determined, that is, a video ring back tone subscribed to by a called user. Therefore, the RBT-AS sends the first request message to the IRS to request interaction information related to the video ring back tone, where the first request message includes a called user identifier and a ring back tone identifier.

The IRS receives the first request message sent by the RBT-AS. The called user identifier is used to indicate a unique called user, and the ring back tone identifier is used to indicate a unique video ring back tone. For example, the called terminal is a mobile phone that uses a subscriber identity module (SIM) card. In this case, the called user identifier is a number of the SIM card.

Operation 502: The IRS determines interaction information corresponding to the called user identifier and the ring back tone identifier.

Because the called user identifier is used to indicate the unique called user and the ring back tone identifier is used to indicate the unique video ring back tone, a pair of the called user identifier and the ring back tone identifier may be used to determine a video ring back tone subscribed to by a called user, and further to determine interaction information corresponding to the video ring back tone. The IRS stores a correspondence between a called user identifier, a ring back tone identifier, and interaction information. The IRS determines, based on the called user identifier, the ring back tone identifier, and the correspondence, the interaction information requested by the RBT-AS.

The interaction information includes at least one interaction identifier used for indicating interaction content and a uniform resource locator (URL) corresponding to each of the at least one interaction identifier. The URL includes an address of the IRS, and a storage address, in the IRS, of the interaction content indicated by the interaction identifier corresponding to the URL.

Further, interaction content indicated by an interaction identifier is interaction content of an interaction manner corresponding to a video ring back tone subscribed to by a called user. The interaction content refers to controls, images, numbers, and texts displayed for a user when the calling terminal provides an interaction service. For example, the interaction content includes a quantity of likes and an icon for giving a like. Interaction content of different interaction manners is different. For example, interaction content for giving a like and interaction content for giving a comment are different. The interaction content for giving a like includes a like icon and a quantity of likes, and the interaction content for giving a comment includes a comment icon and a comment text. The URL corresponding to the interaction identifier is a URL of interaction content indicated by the interaction identifier. The interaction content can be downloaded based on the URL of the interaction content.

For example, an interaction identifier "Zhang San-A-like" indicates interaction content of likes given to a video ring back tone A subscribed to by a called user Zhang San. Another interaction identifier "Li Si-A-like" indicates interaction content of likes given to a video ring back tone A subscribed to by a called user Li Si. It should be noted that the foregoing example shows a possible form of the interaction identifier, and the interaction identifier may be in another form, such as "like-video1", due to a different telecom carrier for the ring back tone. A particular form of the interaction identifier is not limited in this embodiment of this application.

Operation 503: The IRS sends the interaction information to the RBT-AS.

The IRS sends the interaction information to the RBT-AS, so that the RBT-AS configures the interaction information into an SDP message in a subsequent operation and sends the SDP message to the calling terminal. Correspondingly, the RBT-AS receives the interaction information fed back by the IRS based on the called user identifier and the ring back tone identifier.

Operation 504: The RBT-AS sends a media resource request to an RBT-MRS.

After the negotiation for the call media resource is completed between the calling terminal and the called terminal, the RBT-AS sends the media resource request to the RBT-MRS. The media resource request is used to request an SDP of a ring back tone media resource. The ring back tone media resource refers to a transmission parameter for a video ring back tone media stream to be transmitted by the RBT-MRS to the calling terminal in a subsequent operation. The SDP of the ring back tone media resource describes the ring back tone media resource, that is, a particular transmission parameter.

The ring back tone media resource includes at least one of the following: an IP, a port number, a transmission protocol, an encoding format, and a bandwidth.

It should be noted that the ring back tone media resource may be the same as or different from the call media resource described above. This is not limited in this embodiment of this application.

Operation 505: The RBT-MRS sends the SDP to the RBT-AS.

The RBT-MRS sends the foregoing SDP to the RBT-AS.

Operation 506: The RBT-AS configures the interaction information into the SDP to generate the SDP message.

After obtaining the SDP and the interaction information, the RBT-AS configures the interaction information into the SDP to generate the SDP message. The RBT-AS adds each of the interaction identifier and the URL corresponding to the interaction identifier that are in the interaction information to a format field of information i to generate the SDP message. The SDP message is bottom-layer information, and is used to describe a transmission parameter such as a port number and does not need to be encoded for transmission. Therefore, encoding does not need to be performed either when the interaction information is configured into the SDP message.

For example, a part of content of the SDP message is as follows:
v=0
0=–29879336156 29879336158 IN IP6 5555::ccc:aaa:abc:abc
s=–
c=IN IP6 5555::ccc:aaa:abc:abc
t=0 0
m=video 7398 RTP/AVPF 98
i=<InteractiveElement>button;like_video1;300;400;
{value1};{http://www.irs.com/button1.png};
<InteractiveElement>ad;ad_video1;{http://www.irs.com/ad1.html}; /a field of information i
b=AS:75
a=curr:qos local sendonly
a=curr:qos remote none
a=des:qos mandatory local sendonly
a=des:qos mandatory remote recvonly
a=rtpmap: 98 H263
a=fmtp:98 profile-level-id=0
m=audio 8386 RTP/AVPF 97 96
b=AS:25.4
a=curr:qos local sendrecv
a=curr:qos remote sendrecv
a=des:qos mandatory local sendrecv
a=des:qos mandatory remote sendrecv
a=rtpmap: 97 AMR
a=fmtp:97 mode-set=0,2,5,7; maxframes
a=rtpmap:96 telephone-event "like_video1" and "ad_video1" in the field of the information i indicate two interaction identifiers.

A URL corresponding to the interaction identifier "like_video1" is http://www.irs.com/button1.png.

A URL corresponding to the interaction identifier "ad_video1" is www.irs.com/ad1.html.

Operation 507: The RBT-AS sends the SDP message to the calling terminal.

The RBT-AS sends the SDP message to the calling terminal, so that the calling terminal obtains the video ring back tone and the interaction content in a subsequent operation based on the SDP message and the interaction information in the SDP message, and further plays the video ring back tone in a display interface and displays interaction content related to the interaction information of the video ring back tone.

In one embodiment, the RBT-AS sends the SDP message to the calling terminal in a form of a session initiation protocol (SIP) update (UPDATE) message.

Operation 508: The calling terminal sends a first response to the RBT-AS.

After receiving the SDP message, the calling terminal sends the first response to the RBT-AS to notify the RBT-AS that the SDP message has been received.

In one embodiment, the calling terminal sends the first response in a form of a 200 OK response.

Operation 509: The calling terminal sends a transmission response to the RBT-AS.

The calling terminal reserves a ring back tone media resource based on a transmission parameter in the SDP message, and then sends the transmission request to the RBT-AS. The transmission request is used to request the RBT-MRS to transmit the video ring back tone media stream.

In one embodiment, the calling terminal sends the transmission request to the RBT-AS in a form of an update message.

Operation 510: The RBT-AS sends a transmission response to the calling terminal.

The RBT-AS sends the transmission response to the calling terminal to notify the calling terminal to be ready for receiving the video ring back tone media stream transmitted by the RBT-MRS.

Operation 511: The RBT-AS notifies the RBT-MRS to transmit the video ring back tone media stream to the calling terminal.

The RBT-AS notifies the RBT-MRS that the calling terminal has reserved the ring back tone media resource and transmission of the video ring back tone media stream is to be started.

Operation 512: The calling terminal receives the video ring back tone media stream.

The calling terminal receives, based on the transmission parameter in the SDP message, the video ring back tone media stream sent by the RBT-MRS. The video ring back tone media stream includes a video ring back tone. The calling terminal obtains, from the video ring back tone media stream sent by the RBT-MRS, the video ring back tone that needs to be played.

Operation 513: The calling terminal sends a resource request message to the IRS.

The calling terminal generates the resource request message based on the interaction information in the received SDP message, and sends the resource request message to the IRS based on an address of the IRS in the SDP message. The resource request message includes the at least one interaction identifier and the URL corresponding to each of the at least one interaction identifier. The resource request message is used to request, from the IRS, the interaction content related to the interaction information.

For example, the interaction information includes two interaction identifiers "Zhang San-A-like" and "Zhang San-A-comment". In this case, the resource request message includes "Zhang San-A-like" and a URL corresponding to the interaction identifier, and "Zhang San-A-comment" and a URL corresponding to "Zhang San-A-comment", and is used to request, from the IRS, interaction content of likes and comments given to the video ring back tone A subscribed to by the called user Zhang San.

In one embodiment, the interaction information further includes a manner identifier corresponding to each of the at least one interaction identifier. The manner identifier is used to indicate an interaction manner corresponding to interaction content indicated by an interaction identifier. The calling terminal generates the resource request message based on the manner identifier and a preset interaction manner, where the preset interaction manner is a preset interaction manner supported by the calling terminal.

The calling terminal generates the resource request message based on the manner identifier and the preset interaction manner, to request interaction content of an interaction manner supported by the calling terminal. For example, the preset interaction manner is giving a like, and the interaction information includes two manner identifiers: "giving a like" and "giving a comment". In this case, the resource request message generated by the calling terminal includes "Zhang San-A-like" corresponding to "giving a like" and a URL corresponding to the interaction identifier.

Operation 514: The IRS determines the related interaction content based on the at least one interaction identifier and the URL corresponding to each of the at least one interaction identifier.

Interaction content indicated by an interaction identifier is interaction content of an interaction manner corresponding to a video ring back tone subscribed to by a called user, and a URL corresponding to the interaction identifier is a URL of the interaction content indicated by the interaction identifier. Therefore, based on an interaction identifier and a URL corresponding to the interaction identifier, a unique piece of interaction content can be determined and obtained, that is, interaction content related to the interaction identifier and the URL corresponding to the interaction identifier. The IRS determines, based on the interaction identifier, the interaction content indicated by the interaction identifier, and obtains the interaction content based on the URL corresponding to the interaction identifier.

Operation 515: The IRS sends the interaction content to the calling terminal.

The IRS sends, to the calling terminal, interaction content indicated by all interaction identifiers in the resource request message.

Operation 516: The calling terminal plays the video ring back tone in the display interface, and displays the interaction content related to the interaction information.

When the called terminal is ringing, the calling terminal plays the video ring back tone in the display interface for the user to watch. Meanwhile, the calling terminal displays, in the display interface, the interaction content sent by the IRS, for the user to interact.

In one embodiment, in operations 507 to 510, the calling terminal may communicate with the RBT-AS via an S-CSCF. Information, data, and messages transmitted for communication between the calling terminal and the RBT-AS are forwarded by the S-CSCF to a peer end.

In one embodiment, after operation 516, the user may perform an interaction operation on the calling terminal, for example, click a like icon to give a like. The calling terminal communicates with the IRS based on the interaction operation, to update the interaction content. In one embodiment, the following operations may be included.

Operation 517: The calling terminal obtains an interaction operation event that is of a calling user and that is recorded by an operating system of the calling terminal.

The operating system of the calling terminal monitors all interaction operations of the user. When the user performs an interaction operation, the operating system of the calling terminal generates an interaction operation event corresponding to the interaction operation. The interaction operation event includes an operation type, time, and coordinate parameters. For example, the user clicks a like icon to give a like, and such an interaction operation corresponds to an interaction operation event that includes an operation type of a click, time of YYYYMMDDHHMMSS, and coordinates of the operation in the screen displayed on the calling terminal.

Operation 518: The calling terminal determines an interaction operation procedure corresponding to the interaction operation event.

The calling terminal determines an interaction operation procedure corresponding to the interaction operation event, based on the interaction operation event, a relationship between the interaction operation event and interaction content corresponding to the interaction operation event, and a relationship between the interaction content and the interaction operation procedure corresponding to the interaction content. Different interaction operation events correspond to different interaction content, and different interaction content corresponds to different interaction operation procedures.

For example, an interaction operation event of giving a like corresponds to interaction content for giving a like, and an interaction operation procedure corresponding to the interaction content for giving a like is to add 1 to a quantity of likes. An interaction operation event of giving a comment corresponds to interaction content for giving a comment, and an interaction operation procedure corresponding to the interaction content for giving a comment is to display a comment input interface and obtain information input by the user. Therefore, the calling terminal determines the interaction operation procedure corresponding to the interaction operation event.

In one embodiment, the calling terminal stores a correspondence between an interaction manner and an interaction operation process. The calling terminal determines, based on an interaction manner corresponding to the interaction content and the correspondence, an interaction operation procedure corresponding to the interaction content.

Operation 519: The calling terminal performs the interaction operation procedure and obtains an interaction operation result.

The calling terminal performs the interaction operation procedure and obtains the interaction operation result based on the interaction operation procedure. The interaction operation result indicates a change of the interaction content corresponding to the interaction operation event. For example, the calling terminal performs the interaction operation procedure corresponding to the interaction operation event of giving a like, and an obtained interaction operation result is to add 1 to the quantity of likes.

In one embodiment, the interaction operation procedure includes: generating and displaying a new interface element, and collecting data subsequently input by the user. For example, when the user gives a comment, a comment input interface is generated and displayed, and then information input by the user is obtained.

Operation 520: The calling terminal sends the interaction operation result to the IRS.

The calling terminal sends the interaction operation result to the IRS, so that the IRS updates the interaction operation result to an interaction content database, in other words, updates the interaction content based on the interaction operation result.

In one embodiment, the calling terminal further sends an interaction identifier to the IRS. Interaction content indicated by the interaction identifier is the same as the interaction content corresponding to the interaction operation event. Correspondingly, the IRS updates, based on the interaction operation result, the interaction content indicated by the interaction identifier.

For example, an interaction identifier sent by the calling terminal to the IRS is "Zhang San-A-like", and an interaction operation result is to add 1 to a quantity of likes. Correspondingly, the IRS updates interaction content indicated by the interaction identifier "Zhang San-A-like", and adds 1 to the quantity of likes.

In one embodiment, after updating the interaction content based on the interaction operation result, the IRS sends an update response to the calling terminal. After receiving the update response, the calling terminal updates the interaction content corresponding to the interaction operation event.

Figure 6:
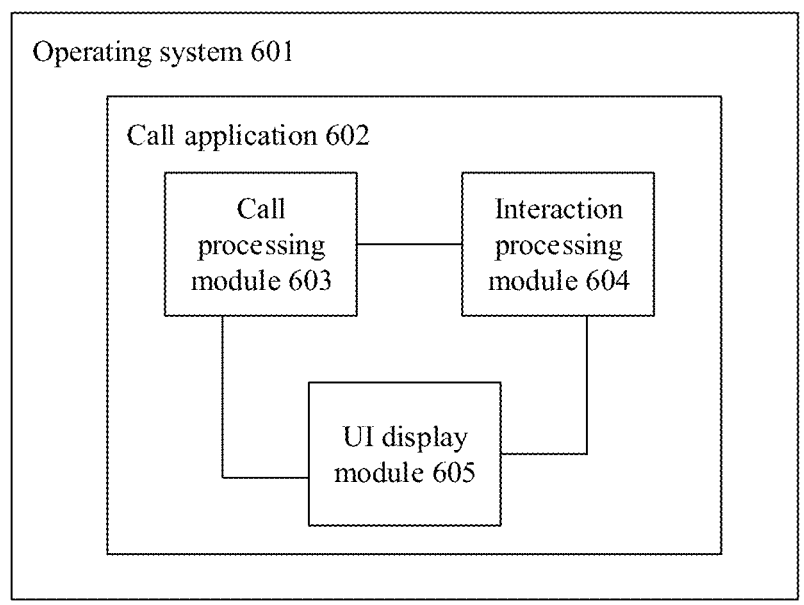
FIG. 6 is a schematic diagram of a system structure of a calling terminal according to an embodiment of this application.

In one embodiment, as shown in FIG. 6, the calling terminal includes an operating system (OS) 601 and a call application 602 running in the OS. The call application includes a call processing module 603, an interaction processing module 604, and a user interface (UI) display module 605. The call processing module 603 is configured to implement a call function of the calling terminal, for example, perform dialing and call the called terminal. The interaction processing module 604 is configured to process interaction information and interaction content, for example, parse an SDP message to obtain the interaction information, request the interaction content from an IRS, and determine and execute an interaction processing procedure. The UI display module 604 is configured to play a video ring back tone and display the interaction content.

Figure 7:
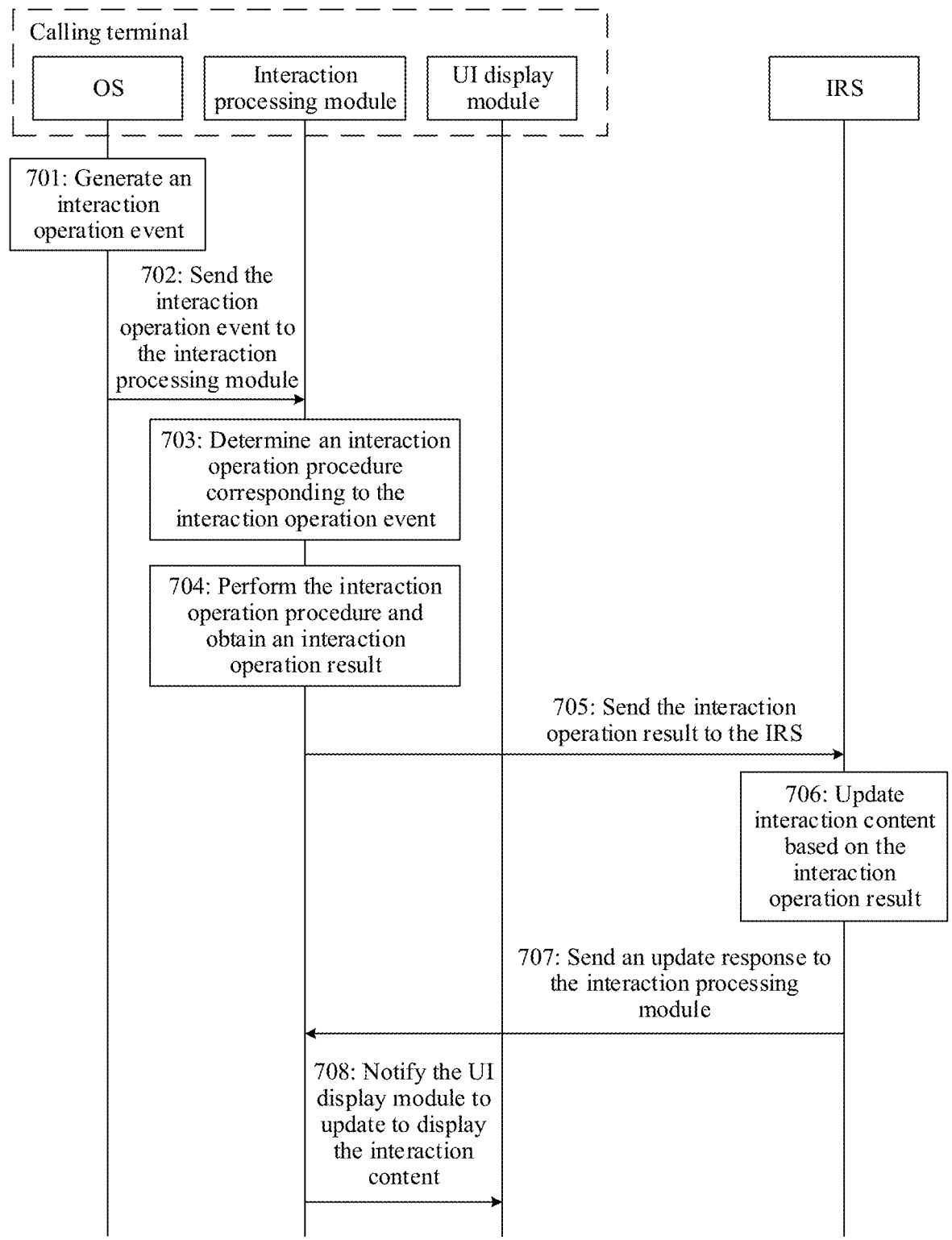
FIG. 7 is a flowchart of an interaction content update method according to an embodiment of this application.

As shown in FIG. 7, operations 517 to 520 may include the following suboperations.

Operation 701: The OS generates an interaction operation event.

The OS monitors all interaction operations of the user. When the user performs an interaction operation, the operating system of the calling terminal generates an interaction operation event corresponding to the interaction operation.

Operation 702: The OS sends the interaction operation event to the interaction processing module.

Operation 703: The interaction processing module determines an interaction operation procedure corresponding to the interaction operation event.

The interaction processing module determines an interaction operation procedure corresponding to the interaction operation event, based on the interaction operation event, a relationship between the interaction operation event and interaction content corresponding to the interaction operation event, and a relationship between the interaction content and the interaction operation procedure corresponding to the interaction content. The interaction processing module first determines the corresponding interaction content based on the interaction operation event, and then determines the corresponding interaction operation procedure based on the interaction content.

Operation 704: The interaction processing module performs the interaction operation procedure and obtains an interaction operation result.

The interaction processing module performs the interaction operation procedure and obtains the interaction operation result based on the interaction operation procedure. The interaction operation result indicates a change of the interaction content corresponding to the interaction operation event.

Operation 705: The interaction processing module sends the interaction operation result to the IRS.

Operation 706: The IRS updates the interaction content based on the interaction operation result.

The IRS updates the interaction operation result to an interaction content database, in other words, updates the interaction content based on the interaction operation result.

Operation 707: The IRS sends an update response to the interaction processing module.

In one embodiment, the IRS sends the update response in a form of a 200 OK response.

Operation 708: The interaction processing module notifies the UI display module to update to display the interaction content.

After receiving the update response, the interaction processing module determines that the IRS has updated the interaction content. Therefore, the interaction processing module notifies the UI display module to update to display the interaction content. Correspondingly, the UI display module updates to display the interaction content corresponding to the interaction operation event.

According to the solution provided in this application, the RBT-AS configures the interaction information into the SDP message and sends the SDP message to the calling terminal. Because the interaction information is included in the SDP message, the calling terminal does not need to perform decoding and can directly obtain the interaction information from the SDP message. In addition, the RBT-AS does not need to encode the interaction information either when sending the interaction information. Therefore, encoding and decoding processes are not required at a transmit end and a receive end respectively, and extra processing overheads are avoided.

In addition, an IRS is added, and an interaction interface is added between the RBT-AS and the IRS server, to support the RBT-AS to request corresponding interaction information from the IRS. Further, because encoding and decoding processes are not required at a transmit end and a receive end respectively, no coders need to be deployed at the transmit end and the receive end. Therefore, development complexity at the receive end and the transmit end is reduced, and processing delays for interaction information distribution and parsing are reduced.

Figure 8:
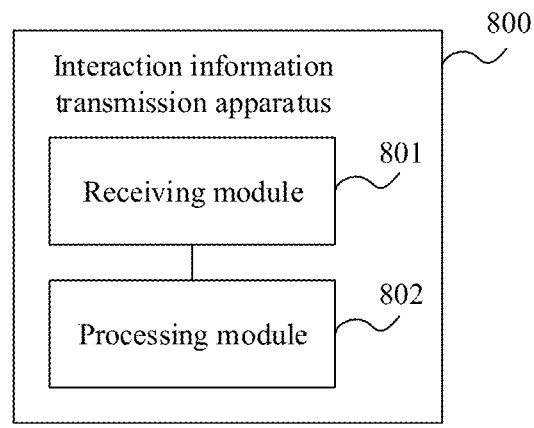
FIG. 8 is a schematic structural diagram of an interaction information transmission apparatus according to an embodiment of this application.

FIG. 8 is a schematic structural diagram of an interaction information transmission apparatus according to an embodiment of this application. An apparatus 800 includes a receiving module 801 and a processing module 802. The apparatus 800 is applied to a calling terminal. In addition, the apparatus 800 may further include another function module or unit, configured to perform the interaction information transmission method in the foregoing embodiment.

The receiving module 801 is configured to: receive an SDP message sent by an RBT-AS, where the SDP message includes interaction information related to a video ring back tone; and receive a video ring back tone media stream sent by an RBT-MRS, where the video ring back tone media stream includes the video ring back tone.

The processing module 802 is configured to: play the video ring back tone in a display interface, and display interaction content related to the interaction information.

According to the apparatus provided in this application, the RBT-AS configures the interaction information into the SDP message and sends the SDP message to the calling terminal. In this way, after receiving the SDP message, the calling terminal does not need to perform decoding and can directly obtain the interaction information from the SDP message. In addition, the RBT-AS that serves as a transmit end does not need to encode the interaction information either when sending the interaction information. Therefore, encoding and decoding processes are not required at the transmit end and a receive end respectively, and extra processing overheads are avoided.

In one embodiment, the interaction information includes at least one interaction identifier used for indicating the interaction content and a URL corresponding to each of the at least one interaction identifier, where the URL includes an address of an interaction resource server IRS and a storage address of the interaction content in the IRS.

The apparatus further includes a sending module. The sending module is configured to send a resource request message to the IRS, where the resource request message includes the at least one interaction identifier and the URL corresponding to each of the at least one interaction identifier.

The receiving module 801 is further configured to receive the interaction content sent by the IRS, where the interaction content sent by the IRS is determined by the IRS based on the at least one interaction identifier and the URL corresponding to each of the at least one interaction identifier that are in the resource request message.

The processing module 802 is further configured to display the interaction content sent by the IRS when invoking a media player to play a ring back tone.

In one embodiment, the processing module 802 is further configured to: obtain an interaction operation event that is of a calling user and that is recorded by an operating system of the calling terminal; determine an interaction operation procedure corresponding to the interaction operation event, based on the interaction operation event, a relationship between the interaction operation event and interaction content corresponding to the interaction operation event, and a relationship between the interaction content and the interaction operation procedure corresponding to the interaction content; and perform the interaction operation procedure and obtain an interaction operation result.

The sending module is further configured to send the interaction operation result to the IRS, so that the IRS updates the interaction operation result to an interaction content database.

In one embodiment, the interaction operation procedure includes: generating and displaying a new interface element, and collecting data subsequently input by the user.

Figure 9:
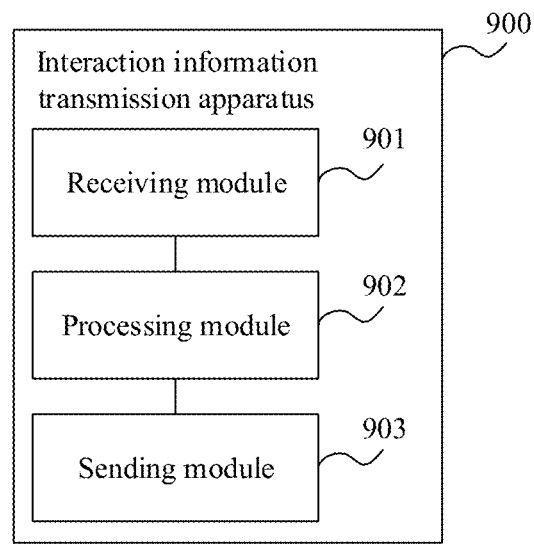
FIG. 9 is a schematic structural diagram of another interaction information transmission apparatus according to an embodiment of this application.

FIG. 9 is a schematic structural diagram of an interaction information transmission apparatus according to an embodiment of this application. An apparatus 900 includes a receiving module 901, a processing module 902, and a sending module 903. The apparatus 900 is applied to an RBT-AS. In addition, the apparatus 900 may further include another function module or unit, configured to perform the interaction information transmission method in the foregoing embodiment.

The receiving module 901 is configured to obtain interaction information related to a video ring back tone.

The processing module 902 is configured to configure the interaction information into an SDP to generate an SDP message.

The sending module 903 is configured to send the SDP message to a calling terminal, so that after receiving a video ring back tone media stream, the calling terminal plays the video ring back tone in a display interface and displays interaction content related to the interaction information of the video ring back tone.

According to the apparatus provided in this application, the RBT-AS configures the interaction information into the SDP message and sends the SDP message to the calling terminal. Because the interaction information is included in the SDP message, the calling terminal does not need to perform decoding and can directly obtain the interaction information from the SDP message. In addition, the RBT-AS that serves as a transmit end does not need to encode the interaction information either when sending the interaction information. Therefore, encoding and decoding processes are not required at the transmit end and a receive end respectively, and extra processing overheads are avoided.

In one embodiment, the sending module 903 is further configured to send a first request message to an interaction resource server IRS, where the first request message includes a called user identifier and a ring back tone identifier.

The receiving module 901 is configured to: receive the interaction information fed back by the IRS based on the called user identifier and the ring back tone identifier.

In one embodiment, the interaction information includes at least one interaction identifier used for indicating the interaction content and a URL corresponding to each of the at least one interaction identifier, where the URL includes an address of the IRS and a storage address of the interaction content in the IRS.

The processing module 902 is configured to add each of the at least one interaction identifier and the URL corresponding to the interaction identifier that are in the interaction information to a format field of information i to form the SDP message.

Figure 10:
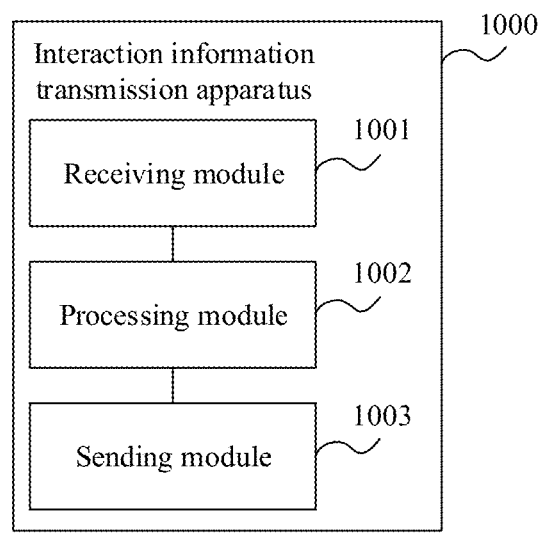
FIG. 10 is a schematic structural diagram of another interaction information transmission apparatus according to an embodiment of this application.

FIG. 10 is a schematic structural diagram of an interaction information transmission apparatus according to an embodiment of this application. An apparatus 1000 includes a receiving module 1001, a processing module 1002, and a sending module 1003. The apparatus 1000 is applied to an IRS. In addition, the apparatus 1000 may further include another function module or unit, configured to perform the interaction information transmission method in the foregoing embodiment.

The receiving module 1001 is configured to receive a first request message sent by an RBT-AS, where the first request message includes a called user identifier and a ring back tone identifier.

A processing module 1002 is configured to determine, based on the called user identifier and the ring back tone identifier, interaction information corresponding to the called user identifier and the ring back tone identifier.

The sending module 1003 is configured to send the interaction information to the RBT-AS, so that the RBT-AS generates an SDP message based on the interaction information.

According to the solution provided in this application, the IRS sends the interaction information to the RBT-AS based on the first request message, so that the RBT-AS generates the SDP message based on the interaction information. In this way, after receiving the SDP message, a calling terminal does not need to perform decoding and can directly obtain the interaction information from the SDP message. In addition, the RBT-AS that serves as a transmit end does not need to encode the interaction information either when sending the interaction information. Therefore, encoding and decoding processes are not required at the transmit end and a receive end respectively, and extra processing overheads are avoided.

In one embodiment, the interaction information includes at least one interaction identifier used for indicating interaction content and a URL corresponding to each of the at least one interaction identifier, where the URL includes an address of the IRS and a storage address of the interaction content in the IRS.

The receiving module 1001 is further configured to: after sending the interaction information to the RBT-AS, receive a resource request message sent by the calling terminal, where the resource request message includes the at least one interaction identifier and the URL corresponding to each of the at least one interaction identifier.

The processing module 1002 is further configured to determine interaction content that is related to the at least one interaction identifier and the URL corresponding to each of the at least one interaction identifier.

The sending module 1003 is further configured to send the interaction content to the calling terminal.

Figure 11:
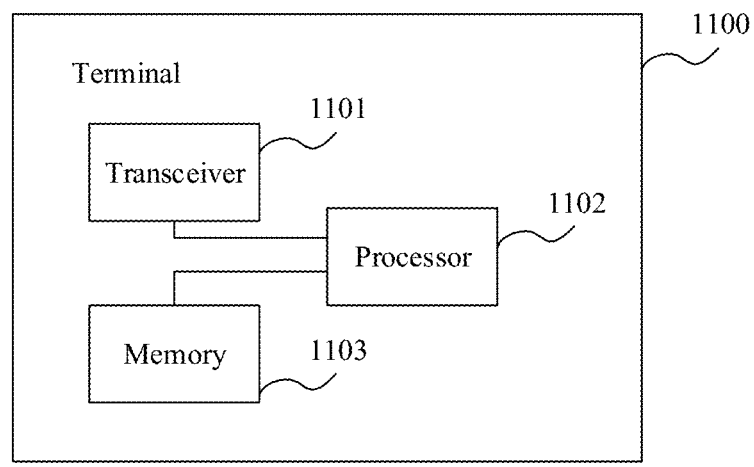
FIG. 11 is a schematic structural diagram of a terminal according to an embodiment of this application.

In a hardware implementation, as shown in FIG. 11, this application further provides a terminal. A terminal 1100 may be the calling terminal in the foregoing method embodiments, or may be a called terminal.

In one embodiment, the terminal 1100 may include a transceiver 1101, a processor 1102, and a memory 1103. The terminal may further include more or fewer components, or combine some components, or have different component arrangements. This is not limited in this application.

The transceiver 1101 is configured to receive and send information or data, and perform data transmission with another device in a network. Further, the transceiver 1101 may include a transceiver module, and the transceiver module may include communications modules such as a wireless local area network (WLAN) module, a Bluetooth module, and a baseband module, and a radio frequency (RF) circuit corresponding to the communications module. The transceiver module is configured to perform communication in a wireless local area network, Bluetooth communication, infrared communication, and/or communication in a cellular communications system, for example, wideband code division multiple access (WCDMA) and/or high speed downlink packet access (HSDPA). The transceiver module is configured to control communication between components in the terminal, and may support direct memory access.

The processor 1102 is a control center of the terminal. The processor 1102 connects various parts of the entire terminal through various interfaces and lines, runs or executes a software program and/or a unit stored in the memory 1103, and invokes data stored in the memory 1103, to perform various functions of the terminal and/or process data.

Further, the processor 1102 may include an integrated circuit (IC), for example, may include a single packaged IC, or may include a plurality of connected packaged ICs that have a same function or different functions. For example, the processor may include only a central processing unit (CPU), or may be a combination of a GPU, a digital signal processor (DSP), an image processor, and a control chip (such as a baseband chip) in the transceiver.

The memory 1103 may include a volatile memory, for example, a random access memory (RAM); or may include a nonvolatile memory, for example, a flash memory, a hard disk drive (HDD), or a solid-state drive (SSD). The memory may further include a combination of the foregoing types of memories. The memory may store a program or code. The processor 1102 executes the program or the code to implement functions of the terminal.

In this embodiment, a function implemented by the transceiver 1101 may be implemented by the receiving module and the sending module in the apparatus embodiment shown in FIG. 8, or may be implemented by the transceiver 1101 controlled by the processor 1102. A function implemented by each processing module may be implemented by the processor 1102.

Figure 12:
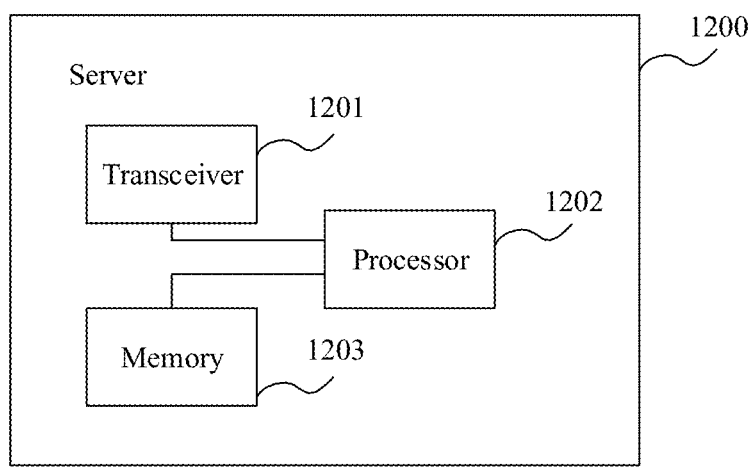
FIG. 12 is a schematic structural diagram of a server according to an embodiment of this application.

In a hardware implementation, as shown in FIG. 12, a server is further provided in this application. In one embodiment, the server 1200 may include a transceiver 1201, a processor 1202, and a memory 1203. The server may further include more or fewer components, or combine some components, or have different component arrangements. This is not limited in this application.

The transceiver 1201 is configured to receive and send information or data, and perform data transmission with another device in a network. Further, the transceiver 1201 may include a transceiver module, and the transceiver module may include communications modules such as a wireless local area network (WLAN) module, a Bluetooth module, and a baseband module, and a radio frequency (RF) circuit corresponding to the communications module. The transceiver module is configured to perform communication in a wireless local area network, Bluetooth communication, infrared communication, and/or communication in a cellular communications system, for example, wideband code division multiple access (WCDMA) and/or high speed downlink packet access (HSDPA). The transceiver module is configured to control communication between components in a network device, and may support direct memory access.

The processor 1202 is a control center of the server. The processor 1202 connects various parts of the entire server through various interfaces and lines, runs or executes a software program and/or a unit stored in the memory 1203, and invokes data stored in the memory 1203, to perform various functions of the server and/or process data.

Further, the processor 1202 may include an integrated circuit (IC), for example, may include a single packaged IC, or may include a plurality of connected packaged ICs that have a same function or different functions. For example, the processor may include only a central processing unit (CPU), or may be a combination of a GPU, a digital signal processor (DSP), an image processor, and a control chip (such as a baseband chip) in the transceiver.

The memory 1203 may include a volatile memory (volatile memory), for example, a random access memory (RAM); or may include a nonvolatile memory, for example, a flash memory, a hard disk drive (HDD), or a solid-state drive (SSD). The memory may further include a combination of the foregoing types of memories. The memory may store a program or code. The processor 1202 executes the program or the code to implement functions of the terminal.

In this embodiment, a function implemented by the transceiver 1201 may be implemented by the receiving module and the sending module in the apparatus embodiment shown in FIG. 8, or may be implemented by the transceiver 1201 controlled by the processor 1202. A function implemented by each processing module may be implemented by the processor 1202.

In one embodiment, the server may be the interaction resource server IRS, or may be a ring back tone application server RBT-AS, or may be a server or server cluster that includes an IRS and an RBT-AS in the foregoing embodiments.

In one embodiment, the server may be an RBT-AS, or may be an RBT-MRS, or may be a server or server cluster that includes an RBT-AS and an RBT-MRS in the foregoing embodiments.

In addition, an embodiment of this application further provides an interaction information transmission system. The system includes the terminal in the embodiment shown in FIG. 11 and the server in the embodiment shown in FIG. 12, to implement the interaction information transmission method in the foregoing method embodiment.

Further, this application provides a computer storage medium. The computer storage medium may store a program, and when the program is executed, some or all of the operations in the embodiments for the interaction information transmission method provided in this application may be performed. The storage medium may be a magnetic disk, an optical disc, a read-only memory (ROM), a random access memory (RAM), or the like.

All or some of the foregoing embodiments may be implemented by software, hardware, firmware, or any combination thereof. When software is used to implement the embodiments, all or some of the embodiments may be implemented in a form of a computer program product.

The computer program product includes one or more computer instructions. When the computer instructions are loaded and executed on a computer, all or some of the procedures or functions according to the foregoing embodiments of this application are generated. The computer may be a general-purpose computer, a dedicated computer, a computer network, or another programmable apparatus.

The computer instructions may be stored in a computer-readable storage medium, or may be transmitted from a computer-readable storage medium to another computer-readable storage medium. For example, the computer instructions may be transmitted from a website, a computer, a server, or a data center to another website, computer, server, or data center in a wired or wireless manner.

For same or similar parts in the embodiments in this specification, refer to each other. In particular, the apparatus embodiments are basically similar to the method embodiments, and therefore are described briefly. For related parts, refer to the descriptions in the method embodiments.

In addition, in the descriptions of this application, "a plurality of" means two or more unless otherwise specified. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference.

The foregoing embodiments of this application are not intended to limit the protection scope of this application.

What is claimed is:

1. An interaction information transmission method comprising:
   receiving, by a calling terminal, a session description protocol (SDP) message sent by a ring back tone application server, wherein the SDP message comprises interaction information that comprises at least one interaction identifier used for indicating an interaction content related to a video ring back tone;
   receiving, by the calling terminal, a video ring back tone media stream sent by a ring back tone media resource server, wherein the video ring back tone media stream comprises the video ring back tone; and
   playing, by the calling terminal, the video ring back tone in a display interface, and displaying the interaction content related to the interaction information.

2. The method according to claim 1, wherein, the interaction information further comprises a uniform resource locator (URL) corresponding to each of the at least one interaction identifier, wherein, the URL comprises an address of an interaction resource server and a storage address of the interaction content in the interaction resource server; and
   before the displaying, by the calling terminal, interaction content related to the interaction information, the method further comprises:
   sending, by the calling terminal, a resource request message to the interaction resource server, wherein the resource request message comprises the at least one interaction identifier and the URL corresponding to each of the at least one interaction identifier; and
   receiving, by the calling terminal, the interaction content sent by the interaction resource server, wherein the interaction content is determined by the interaction resource server based on the at least one interaction identifier and the URL corresponding to each of the at least one interaction identifier that are in the resource request message.

3. The method according to claim 1, wherein the method further comprises:
   obtaining, by the calling terminal, an interaction operation event that is of a calling user and that is recorded by an operating system of the calling terminal;
   determining, by the calling terminal, an interaction operation procedure corresponding to the interaction operation event, based on the interaction operation event, a relationship between the interaction operation event and interaction content corresponding to the interaction operation event, and a relationship between the interaction content and the interaction operation procedure corresponding to the interaction content;

performing, by the calling terminal, the interaction operation procedure and obtaining an interaction operation result; and sending, by the calling terminal, the interaction operation result to an interaction resource server.

4. The method according to claim 3, wherein the interaction operation procedure comprises: generating and displaying a new interface element, and collecting data subsequently input by the user.

5. The method according to claim 1, wherein
the ring back tone application server is configured to:
obtain the interaction information,
configure the interaction information into a SDP to generate the SDP message; and
send the SDP message to the calling terminal.

6. The method according to claim 5, wherein the ring back tone application server is further configured to:
send a first request message to an interaction resource server, wherein the first request message comprises a called user identifier and a ring back tone identifier; and
receive the interaction information fed back by the interaction resource server based on the called user identifier and the ring back tone identifier.

7. The method according to claim 5, wherein, the interaction information further comprises a uniform resource locator URL corresponding to each of the at least one interaction identifier, wherein, the URL comprises an address of an interaction resource server and a storage address of the interaction content in the interaction resource server; and
the ring back tone application server is further configured to:
add each of the at least one interaction identifier and the URL corresponding to each of the at least one the interaction identifier that are in the interaction information to a format field of information i to form the SDP message.

8. The method according to claim 6, wherein the interaction resource server is configured to:
receive the first request message sent by the ring back tone application server;
determine, based on the called user identifier and the ring back tone identifier, the interaction information corresponding to the called user identifier and the ring back tone identifier; and
send the interaction information to the ring back tone application server.

9. The method according to claim 8, wherein, the interaction information further comprises a URL corresponding to each of the at least one interaction identifier, wherein, the URL comprises an address of the interaction resource server and a storage address of the interaction content in the interaction resource server; wherein
the interaction resource server is further configured to:
after sending the interaction information to the ring back tone application server,
receive a resource request message sent by the calling terminal, wherein the resource request message comprises the at least one interaction identifier and the URL corresponding to each of the at least one interaction identifier;
determine related interaction content based on the at least one interaction identifier and the URL corresponding to each of the at least one interaction identifier; and
send the interaction content to the calling terminal.

10. An interaction information transmission apparatus, applied to a calling terminal, the apparatus comprising:
a transceiver; and
a processor; wherein
the transceiver is configured to receive a session description protocol (SDP) message sent by a ring back tone application server, wherein the SDP message comprises interaction information that comprises at least one interaction identifier used for indicating an interaction content related to a video ring back tone;
the transceiver is further configured to receive a video ring back tone media stream sent by a ring back tone media resource server, wherein the video ring back tone media stream comprises the video ring back tone; and
the processor is configured to: play the video ring back tone in a display interface, and display the interaction content related to the interaction information.

11. The apparatus according to claim 10, wherein, the interaction information further comprises a uniform resource locator (URL) corresponding to each of the at least one interaction identifier, wherein, the URL comprises an address of an interaction resource server interaction resource server and a storage address of the interaction content in the interaction resource server; and
wherein the transceiver is configured to:
send a resource request message to the interaction resource server, wherein the resource request message comprises the at least one interaction identifier and the URL corresponding to each of the at least one interaction identifier; and
receive from interaction resource server the interaction content which is determined by the interaction resource server based on the at least one interaction identifier and the URL corresponding to each of the at least one interaction identifier that are in the resource request message.

12. The apparatus according to claim 11, wherein,
the processor is further configured to: obtain an interaction operation event that is of a calling user and that is recorded by an operating system of the calling terminal; determine an interaction operation procedure corresponding to the interaction operation event, based on the interaction operation event, a relationship between the interaction operation event and interaction content corresponding to the interaction operation event, and a relationship between the interaction content and the interaction operation procedure corresponding to the interaction content; and perform the interaction operation procedure and obtain an interaction operation result; and
the transceiver is further configured to send the interaction operation result to the interaction resource server.

13. The apparatus according to claim 12, wherein the interaction operation procedure comprises: generating and displaying a new interface element, and collecting data subsequently input by the user.

14. An interaction information transmission apparatus, applied to a ring back tone application server, the apparatus comprising:
a transceiver; and
a processor, wherein:
the transceiver is configured to obtain interaction information related to a video ring back tone;
the processor is configured to configure the interaction information into a session description protocol (SDP) to generate an SDP message; and the transceiver is further configured to send the SDP message to a calling terminal.

15. The apparatus according to claim 14, wherein,
the transceiver is further configured to:
send a first request message to an interaction resource server, wherein the first request message comprises a called user identifier and a ring back tone identifier; and
receive the interaction information fed back by the interaction resource server based on the called user identifier and the ring back tone identifier.

16. The apparatus according to claim 14, wherein, the interaction information comprises at least one interaction identifier used for indicating an interaction content and a uniform resource locator (URL) corresponding to each of the at least one interaction identifier, wherein, the URL comprises an address of an interaction resource server and a storage address of the interaction content in the interaction resource server; and
wherein, the processor is configured to add each of the at least one interaction identifier and the URL corresponding to the interaction identifier that are in the interaction information to a format field of information i to form the SDP message.

* * * * *